United States Patent
True et al.

(10) Patent No.: US 10,810,808 B2
(45) Date of Patent: Oct. 20, 2020

(54) AVIONICS SERVER FOR HIGH INTEGRITY TABLET APPLICATIONS

(71) Applicant: HONEYWELL INTERNATIONAL INC., Morris Plains, NJ (US)

(72) Inventors: Willard R. True, Kirkland, WA (US); Richard Berckefeldt, Paola, KS (US); Kalluri R. Sarma, Mesa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 248 days.

(21) Appl. No.: 15/920,015

(22) Filed: Mar. 13, 2018

(65) Prior Publication Data

US 2019/0180530 A1    Jun. 13, 2019

Related U.S. Application Data

(60) Provisional application No. 62/595,623, filed on Dec. 7, 2017.

(51) Int. Cl.
*G07C 5/08* (2006.01)
*G01C 23/00* (2006.01)
(Continued)

(52) U.S. Cl.
CPC .......... *G07C 5/0816* (2013.01); *B64D 43/00* (2013.01); *G01C 23/00* (2013.01); *G06T 7/001* (2013.01); *G06T 2207/30168* (2013.01)

(58) Field of Classification Search
None
See application file for complete search history.

(56) References Cited

U.S. PATENT DOCUMENTS

| 5,175,772 A | 12/1992 | Kahn et al. |
| 7,025,274 B2 | 4/2006 | Solomon et al. |

(Continued)

FOREIGN PATENT DOCUMENTS

| DE | 102009046325 A1 | 5/2010 |
| EP | 3108615 A1 | 12/2016 |

(Continued)

OTHER PUBLICATIONS

USPTO Notice of Allowance for U.S. Appl. No. 15/920,155 dated Dec. 20, 2018.

(Continued)

*Primary Examiner* — Jonathan M Dager
*Assistant Examiner* — Garrett F Evans
(74) *Attorney, Agent, or Firm* — Lorenz & Kopf, LLP (57) ABSTRACT

A server system on an aircraft is provided. The server system is configured to allow critical aeronautical information to be displayed on a cockpit display that is not certified for displaying critical aeronautical information. The server system includes an aircraft interface device configured to interface with one or more aeronautical systems on the aircraft to retrieve critical aeronautical information; an application module configured to generate application data for display on the cockpit display wherein the application data includes at least some of the critical aeronautical information; an interface module configured to transmit the application data to the cockpit display for display; and an integrity checking module configured to retrieve image data from an image sensor trained on a display device in the cockpit display and configured to perform an integrity check on the image data from the image sensor.

20 Claims, 7 Drawing Sheets

(51) Int. Cl.
*B64D 43/00* (2006.01)
*G06T 7/00* (2017.01)

(56) References Cited

U.S. PATENT DOCUMENTS

| | | |
|---|---|---|
| 7,139,644 B2 | 11/2006 | Bernard et al. |
| 7,239,080 B2 | 7/2007 | Ng et al. |
| 8,803,772 B2 | 8/2014 | Kent et al. |
| 9,141,830 B2 | 9/2015 | Uczekaj et al. |
| 9,158,115 B1 | 10/2015 | Worley et al. |
| 9,337,953 B1 | 5/2016 | Raghu et al. |
| 9,341,843 B2 | 5/2016 | Border et al. |
| 9,583,008 B2 | 2/2017 | Marion et al. |
| 9,714,081 B1 | 7/2017 | Hall, III et al. |
| 2002/0039070 A1 | 4/2002 | Ververs |
| 2004/0155186 A1 | 8/2004 | Nestorovic et al. |
| 2005/0231692 A1 | 10/2005 | Sun et al. |
| 2006/0221022 A1 | 10/2006 | Hajjar |
| 2007/0281734 A1 | 12/2007 | Mizrachi |
| 2009/0058682 A1 | 3/2009 | True |
| 2010/0110657 A1 | 5/2010 | Weindorf |
| 2010/0214130 A1 | 8/2010 | Weinmann et al. |
| 2011/0063452 A1 | 3/2011 | Fifis et al. |
| 2011/0101058 A1 | 5/2011 | Heckman |
| 2012/0050487 A1 | 3/2012 | Masumura et al. |
| 2012/0140125 A1 | 6/2012 | Pepitone et al. |
| 2013/0083049 A1 | 4/2013 | Mizuno |
| 2013/0220841 A1 | 8/2013 | Yang |
| 2013/0305391 A1 | 11/2013 | Haukom et al. |
| 2013/0334545 A1 | 12/2013 | Hu et al. |
| 2014/0262847 A1 | 9/2014 | Yang |
| 2014/0264196 A1 | 9/2014 | Werner et al. |
| 2015/0029140 A1 | 1/2015 | Hwang et al. |
| 2015/0241765 A1 | 8/2015 | Hajjar et al. |
| 2015/0277219 A1 | 10/2015 | Gwin et al. |
| 2015/0295897 A1 | 10/2015 | Chang et al. |
| 2016/0122036 A1 | 5/2016 | Hathaway |
| 2016/0349933 A1 | 12/2016 | Owczarski et al. |
| 2017/0078834 A1* | 3/2017 | Anderson ............... H04L 67/12 |
| 2017/0195647 A1 | 7/2017 | Honkanen et al. |
| 2017/0251501 A1* | 8/2017 | Batsakes ............... B64D 43/00 |
| 2019/0075290 A1* | 3/2019 | Dubey ................ H04N 17/002 |

FOREIGN PATENT DOCUMENTS

| | | |
|---|---|---|
| EP | 3210891 A1 | 8/2017 |
| FR | 2818777 A1 | 6/2002 |
| WO | 2010045411 A1 | 4/2010 |
| WO | 2015127203 A1 | 8/2015 |

OTHER PUBLICATIONS

Miller, B., et al; Policy and Guidance for Electronic Flight Bag Class 1 & 2 System Architecture and Aircraft Connectivity; Federal Aviation Administration.

* cited by examiner

AVIONICS SERVER FOR HIGH INTEGRITY TABLET APPLICATIONS

CROSS-REFERENCE TO RELATED APPLICATION

This application claims priority to U.S. Provisional Application No. 62/595,623 filed Dec. 7, 2017. This application incorporates the provisional application into the present application by reference.

TECHNICAL FIELD

The present disclosure generally relates to display systems, and more particularly relates to display systems for displaying critical information on uncertified displays.

BACKGROUND

In many safety critical and/or regulated industries, such as avionics, maritime, rail, medical devices, nuclear, and others, display systems that display mission critical information may need to be certified that they can provide adequate integrity, continuity, and availability (ICA) for the mission critical information to be displayed thereon. The certification process may be costly and time-consuming and, therefore, may deter the implementation of new applications, such as new applications that use personal electronic devices (PEDs) to display mission critical information.

In the avionics industry, low-cost PEDs, such as tablet computers and smartphones, are being used for non-critical applications, such as charts and maps applications and weight and balance calculators. Operators may also want to have the freedom to display aeronautical information, such as airport moving maps, air traffic (Cockpit Display of Traffic Information or CDTI), advanced weather radar information, and others, on tablet computers instead of having to make costly modifications and upgrades to their existing avionics displays. Long-standing regulatory policy prohibits the display of critical aeronautical information during flight on uncertified displays because adequate integrity, continuity, and availability (ICA) cannot be assured.

Accordingly, it is desirable to provide a certifiable system for displaying critical information on uncertified displays or displays not approved for the display of data requiring high ICA. Furthermore, other desirable features and characteristics will become apparent from the subsequent detailed description, taken in conjunction with the accompanying drawings and the foregoing technical field and background.

SUMMARY

Systems and method are provided for allowing the use of uncertified displays to display mission critical information. In one embodiment, a server system on an aircraft including one or more processors configured by programming instructions encoded on non-transient computer readable media is described. The server system is configured to allow critical aeronautical information to be displayed on a cockpit display that is not certified for displaying critical aeronautical information. The server system includes an aircraft interface device configured to interface with one or more aeronautical systems on the aircraft to retrieve or transmit critical aeronautical information; an application module configured to generate application data for display on the cockpit display wherein the application data includes at least some of the critical aeronautical information; an interface module configured to transmit the application data to the cockpit display for display; and an integrity checking module configured to retrieve image data from an image sensor trained on a display device in the cockpit display and configured to perform an integrity check on the image data from the image sensor.

In another embodiment, a server system on an aircraft including one or more processors configured by programming instructions encoded on non-transient computer readable media is provided. The server system is configured to allow critical aeronautical information to be displayed on a cockpit display that is not certified for displaying critical aeronautical information. The server system includes an aircraft interface device configured to interface with one or more aeronautical systems on the aircraft to retrieve or transmit critical aeronautical information; an application module configured to generate application data for display on the cockpit display wherein the application data includes at least some of the critical aeronautical information; and an application programming interface configured to provide a display service function, a data entry service function, and a data integrity function for use by the application module. The display service function is configured to provide a standard way for the application module to display information on the cockpit display. The data entry service function is configured to provide a standard way for the application module to request data from the cockpit display. The data integrity function is configured to provide a standard way for the application module to check on the integrity of the application data displayed on the cockpit display.

In another embodiment, a computer-implemented method in an aircraft computing device for displaying critical aeronautical information on an aircraft display that is not certified for displaying critical aeronautical information is provided. The method includes generating, by the computing device, application data for display on a cockpit display wherein the application data includes critical aeronautical information; transmitting, by the computing device, the application data to the cockpit display for display; retrieving, by the computing device, image data from an image sensor trained on a display device in the cockpit display; and performing, by the computing device, an integrity check on the image data from the image sensor.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. References to aeronautical and/or aviation specific terms such as but not limited to "cockpit", "flight deck", "certification", or "aircraft" are for simplifying the description and are not intended to limit the application and uses to the aviation or aeronautical industry. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Apparatus, systems, methods, techniques and articles are described for providing assurance that an uncertified display, such as a display on a personal electronic device (PED) (e.g., a tablet computer, a smartphone, or some other device), that is used to display mission critical data (e.g., critical aeronautical information) accurately conveys the mission critical data. The apparatus, systems, methods, techniques and articles described herein may provide assurances that an uncertified display accurately conveys mission critical data by verifying the integrity, continuity, and availability (ICA) of the mission critical data displayed on the uncertified display. Loss of accuracy or ICA can be annunciated to operators (e.g., a flight crew) of the uncertified display without reliance on the uncertified display to self-report the loss when displaying the mission critical data.

In the case of aeronautical applications, the apparatus, systems, methods, techniques and articles described herein may allow operators to use a PED to display aeronautical information. This may allow for a more affordable and quicker adoption of new avionics functionality. The described apparatus, systems, methods, techniques and articles may allow for mission critical data such as that generated by multiple high integrity applications (e.g. airborne situational awareness (AIRB) and various other CNS-ATM (Communications Navigation and Surveillance—Air Traffic Management) applications such as flight deck interval management (FIM) or air traffic control controller/pilot data link communication (CPDLC), SURF (Surface Surveillance application that includes an airport moving map with traffic superimposed), and others) to be displayed on uncertified displays. At the same time, the described apparatus, systems, methods, techniques and articles can allow data from lower integrity applications, such as maps and charts, to be displayed on the uncertified displays without changes to the applications or equipment installation.

In the following description, provided is an example implementation that addresses the particular problem of implementing application logic in an otherwise general-purpose input/output and computing device such that the integrity of the data sources, application code, and data outputs can be assured, while display and control functions can be implemented in systems that may not have the same level of integrity assurance.

The use of special I/O hardware (such as an Aircraft Interface Device or AID) can allow either high integrity applications or low integrity applications running in an attached electronic flight bag (EFB) or other general-purpose device to access aircraft data. Such a system cannot be used for high integrity applications unless the attached device itself is developed and certified to the required design assurance level. The disclosed system provides a high integrity application server directly in the I/O device while allowing display and control from a low integrity device.

A technical benefit of this approach is the ability to add high integrity applications to an aircraft that is already using low integrity devices (off-the-shelf tablets or other personal electronic devices) or would like to add these applications without the added cost of installing a class 3 EFB or impacting the existing high integrity display and control systems.

Figure 1:
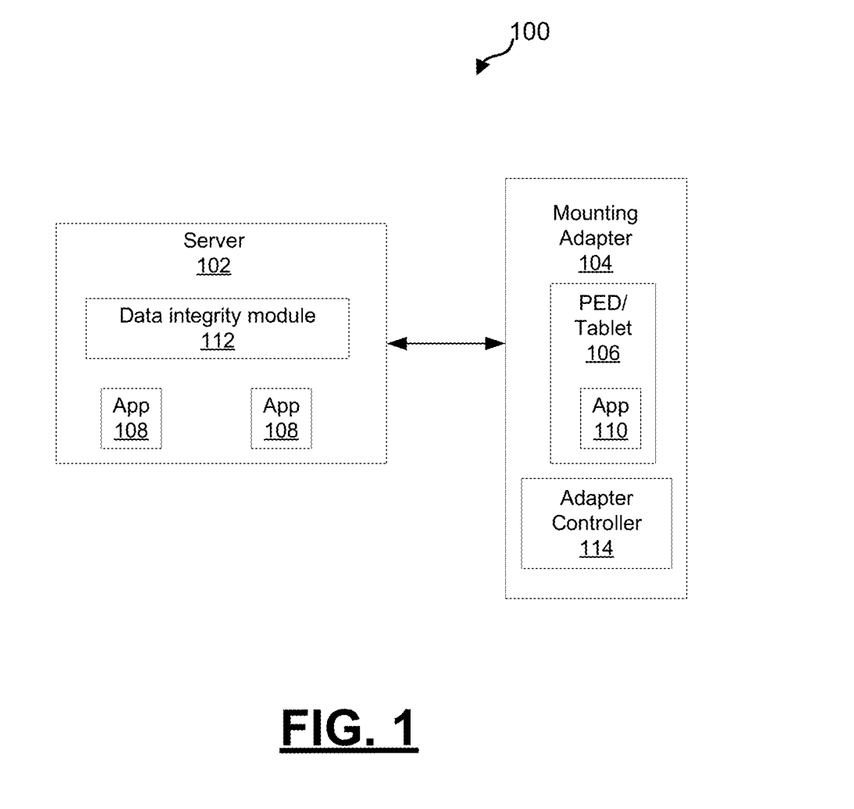
FIG. 1 is a block diagram depicting an example display system in an aircraft that allows uncertified display systems such as commercial PEDs to meet typical avionics requirements for the monitoring of ICA, in accordance with various embodiments.

FIG. 1 is a block diagram depicting an example system 100 that allows an uncertified display system, such as a PED, to meet typical avionics requirements for the monitoring of ICA. The example system 100 includes an application server 102 and a mounting adapter 104 configured to mount a PED 106 (having a PED display) in an aircraft flight deck or cockpit.

The example application server 102 includes at least one processor and a computer-readable storage device or media encoded with programming instructions for configuring the at least one processor. The example application server 102 is positioned in an aircraft. The example application server 102 is a fully certified avionics box that hosts and executes one or more high integrity avionics application modules 108. The high integrity avionics application modules 108 are configured to generate mission critical data (e.g., critical aeronautical information) for display on a cockpit display. The example application server 102 is configured to transmit the generated critical aeronautical information to an uncertified cockpit display (e.g., the PED 106) for display (e.g., on the PED display).

The example application server 102 also includes a data integrity module 112 that is configured to monitor the image displayed on an uncertified cockpit display when critical aeronautical information is transmitted from a high integrity avionics application module 108 to the uncertified cockpit display device (e.g., PED 106) to determine whether a problem exists with the display of the mission critical data on the uncertified display device. The example data integrity module 112 is configured to determine whether a problem exists with the display of the mission critical data on the uncertified display device 106 by verifying the integrity, continuity, and availability (ICA) of the mission critical data displayed on the uncertified display device 106. The example data integrity module 112 is also configured to cause the annunciation of a message indicating that a problem exists with the display of mission critical data on the uncertified display device 106, when it determines that a problem indeed exists.

The mounting adapter 104 is configured to mount an uncertified display device 106 in an aircraft cockpit for use by a flight crew so that the uncertified display device 106 may display critical or non-critical aeronautical information to the flight crew. When the uncertified display device 106 comprises a tablet computer, the mounting adapter 104 may include a clamshell shape to fully enclose the tablet computer 106.

The example uncertified display device 106 may comprise a PED (such as a tablet computer, a smartphone, or some other device), which includes at least one processor and computer readable media, and is configured to host and execute one or more application programs such as a specialized avionics display application 110. The example specialized avionics display application 110 is configured to display critical aeronautical information received by the PED 106 from the application server 102.

The example mounting adapter 104 further includes an adapter controller 114. The example controller 114 includes at least one processor and computer readable media. In other embodiments, the adapter controller 114 may not include a processor. The example controller 114 is configured (for example by programming instructions) to transmit images of the display on the uncertified display device 106 to the data integrity module 112 and to activate the annunciation of a message indicating that a problem exists with the display of mission critical data on the uncertified display device 106, when the data integrity module 112 determines that a problem exists.

Figure 2:
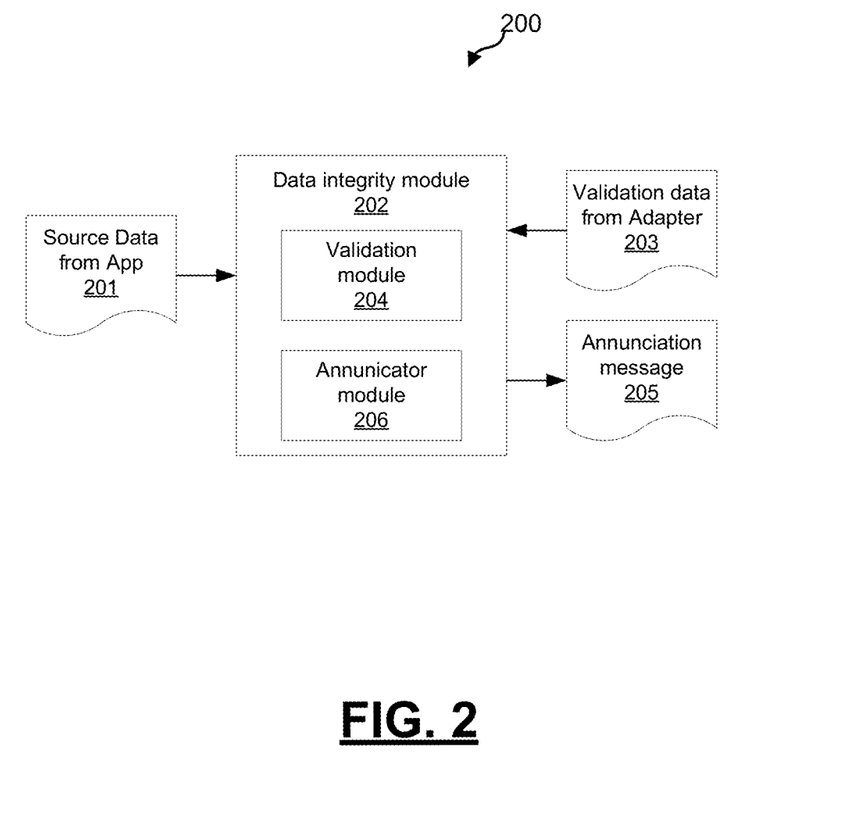
FIG. 2 is a block diagram depicting an example data integrity module in a server in an aircraft that allows the display of critical aeronautical information on an aircraft display that is not certified for displaying critical aeronautical information, in accordance with various embodiments.

FIG. 2 is a block diagram depicting an example data integrity module 202 in a server 200 wherein the example data integrity module provides a way to display critical aeronautical information on an aircraft display that is not certified for displaying critical aeronautical information. The example data integrity module includes a validation module 204 and an annunciator module 206. All or parts of the example data integrity module may be incorporated in an application module (e.g., application module 108 from FIG. 1) or separate from the application module.

The validation module 204 is configured to compare source data 201 (e.g., critical aeronautical information) received by the data integrity module 202 from a high integrity avionics application (e.g., high integrity avionics application module 108 from FIG. 1) to validation data 203 (which includes PED image information) received by the data integrity module 202 from a monitoring adapter (e.g., mounting adapter 104 from FIG. 1). The validation module 204 is configured to compare the source data 201 to the validation data 203 to determine whether a problem exists with the display of mission critical data on the uncertified display device (e.g., PED 106 from FIG. 1). The example validation module 204 is configured to determine whether a problem exists with the display of mission critical data on the uncertified display device (e.g., PED 106) by verifying the ICA of the mission critical data displayed on the uncertified display device (e.g., PED 106).

The annunciator module 206 is configured to communicate an annunciation message 205 (e.g. a loss of ICA) to the mounting adapter (e.g., mounting adapter 104 from FIG. 1) that instructs the mounting adapter to annunciate a message that indicating that a problem exists with the display of mission critical data on the uncertified display device, when the validation module 204 determines that a problem does exist with the display of the mission critical data.

Figure 3:
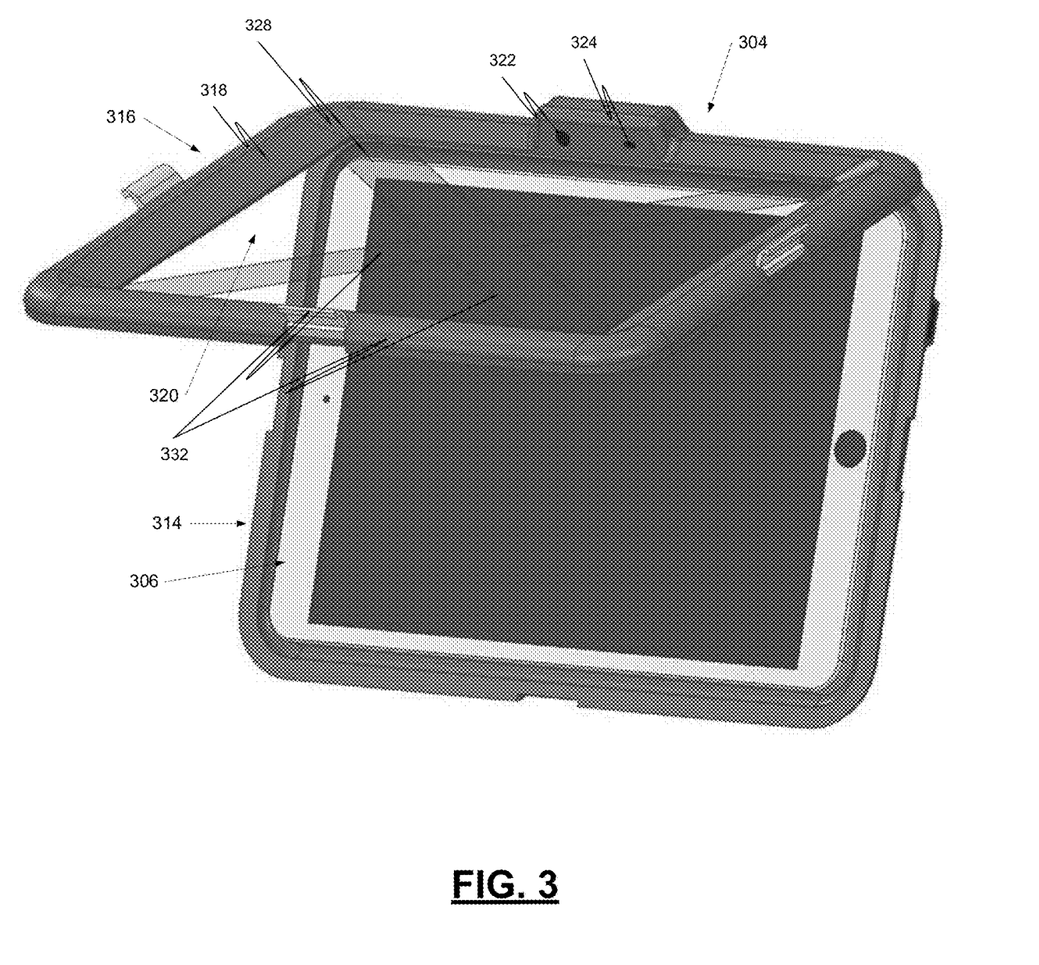
FIG. 3 is a block diagram illustrating an example PED mounting device, in accordance with various embodiments.

FIG. 3 is a block diagram depicting an example mounting adapter 304. The example mounting adapter 304 incorporates a clamshell design configured to mechanically capture a PED/tablet 306 and mount the mounting adapter 304 and PED 306 combination (i.e., the display assembly) in the aircraft flight deck or cockpit.

The example mounting adapter 304 includes a base or back 314 and a lid, cover, or front 316. The example base or back 314 is configured to be slightly larger than the outline of the tablet 306 to be mounted and may have threaded mounting bosses on the back to facilitate installation of the mounting adapter 304 in the aircraft. The example base 314 may also host multiple electrical wiring necessary to provide power and data exchange with the server 302.

The example mounting adapter 304 is also configured with a lid 316 that may be closed over the top of the tablet 306 to fully enclose the tablet 306 within the mounting adapter 304. The example lid 316 includes a bezel 318, a surface 320 (e.g., an optically and capacitively transparent film), an optical imaging device 322 (e.g., a camera), and an actuation source 324 (e.g., optically emissive devices).

The example bezel 318 is attached to the base 314 by hinges (not shown) or other mechanical means and closes around the tablet 306 to mechanically capture the tablet 306. The example bezel 318 also hosts the optically and capacitively transparent film 320, the optical imaging device 322, and the optically emissive devices 324.

The example optically and capacitively transparent film 320 is attached to the bezel 318 in a way that provides it physical contact with the tablet display when the lid 316 is closed to allow for normal touch-gesture control and display action of the tablet 306. Further, the example film 320 has special properties such as an actuatable covering 328 (e.g., a special coating) with applied or embedded nano-particles which are optically active in the presence of an excitation source such as electrical voltage or current or coincident optical or near-optical radiation (such as ultraviolet light). Upon application of the appropriate excitation signal, the coating 328 changes state from normally optically transparent to optically emissive or opaque in a way that is easily visible to an operator in multiple lighting conditions encountered on a flight deck.

An imaging device 322, such as a small camera (e.g., a camera similar to one that might be included in a smart phone), can be mounted or embedded on/in the bezel 318 of the lid 316 and aimed in a manner to provide for maximum view of the tablet display. More than one imaging device 322 may be used or a corrective lens (not shown) may be applied to compensate for the extremely oblique viewing angle the imaging device 322 may have with the tablet's display. The viewing angle of the imaging device(s) 322 may be enhanced or augmented by the use of lenses to optimize the image quality.

An actuation source 324, such as optically emissive devices (e.g., LEDs (light-emitting diodes) operating in a non-visible light band) may be located on the bezel and trained on the cover film 320 to illuminate the film's coating and activate its optical qualities. The LEDs, in some embodiments, may produce light in the UV-A band (320-400 nm) and, in some embodiments, may produce light at 385 nm for the color red. Other optically reactive technology, such as MEMS (Microelectromechanical systems) scanners and laser diodes, may alternatively be located on the bezel and trained on the cover film 320 to illuminate the film's coating and activate its optical qualities. Alternatively, if the actuatable covering 328 can be activated by an electrical signal, then the optically emissive devices 324, MEMS scanners, and laser diodes would not be needed in the bezel.

The example mounting adapter 304 further includes an adapter controller (not shown). The adapter controller is configured to transmit images from the display on the PED 306 to an application server (e.g., server 102 from FIG. 1), receive messages from the server indicating that a problem exists with the display of mission critical data on the tablet display (e.g. a loss of ICA), and cause the actuation source 324 to actuate the covering 328 to annunciate a message indicating that a problem exists with the display of mission critical data on the tablet display, when the server determines that a problem exists with the display of the mission critical data.

Figure 4:
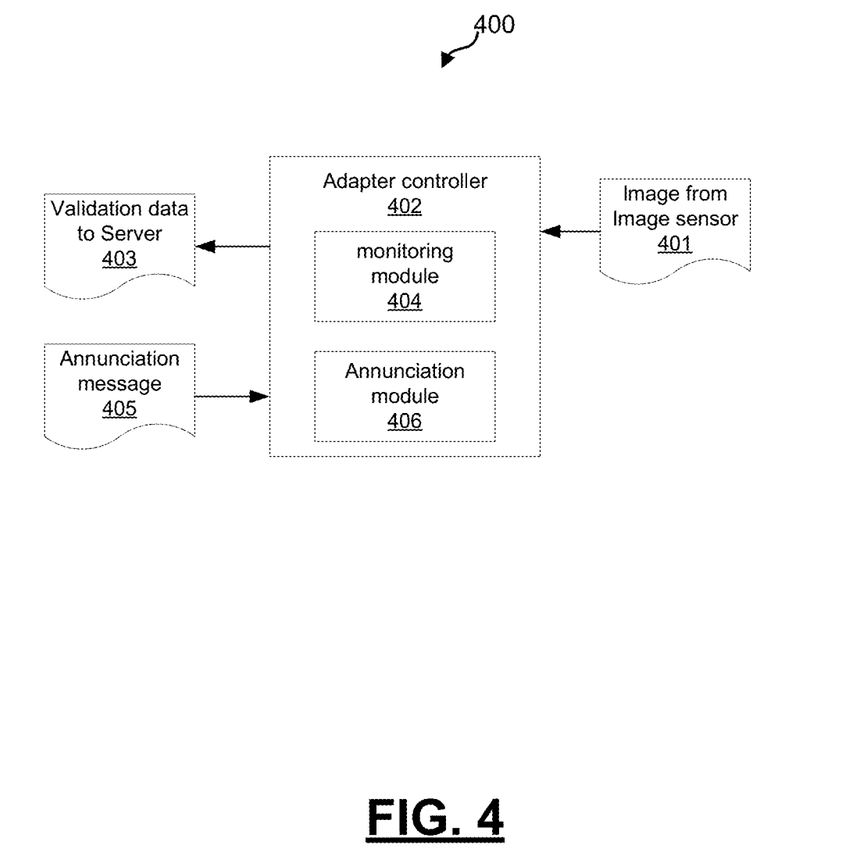
FIG. 4 is a block diagram depicting an example adapter controller in an adapter for allowing the display of critical aeronautical information on an aircraft display that is not certified for displaying critical aeronautical information, in accordance with various embodiments.

FIG. 4 is a block diagram depicting an example adapter controller 402 in a mounting adapter 400. The example adapter controller includes a monitoring module 404 and an annunciation module 406. The example adapter controller 402 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller. In other embodiments, the adapter controller 402 may not include a processor.

The example monitoring module 404 is configured to retrieve an image 401 of the PED display from an imaging sensor (e.g., imaging sensor from imaging device 322 from FIG. 3) and transmit validation data 403 (which includes image information from the PED display) to an application server (e.g., server 102 from FIG. 1). The example annunciation module 406 is configured to receive an annunciation message 405 from the server indicating that a problem exists with the display of mission critical data on the PED display (e.g. a loss of ICA), and cause an actuation source (e.g., actuation source 324 from FIG. 3) to actuate the covering 328 to annunciate a message indicating that a problem exists with the display of mission critical data on the PED display, when the server determines that a problem exists with the display of the mission critical data.

Referring again to FIGS. 1 and 3, the example system 100 may function as follows. An avionics application 108 such as a CDTI may execute on the server 102 while an avionics display application 110 executes on the tablet 106 or 306. The tablet 106 or 306 is enclosed in the mounting adapter 104 or 304 which is mounted on the flight deck in a suitable location (e.g., on the outboard side of the crew's seats). The mounting adapter 104 or 304 may be connected to the server 102 by several bus wires, such as a bi-directional data bus which allows for information exchanges between the tablet 106 or 306 and the server 102 (and perhaps supplies power to the tablet), a bus to carry video information from the imaging device 322 to the server 102, and a signal or power bus from the server 102 to the actuation source 324. The mounting adapter 104 or 304 may be additionally differentiated from commercially available tablet cases in that it may be qualified for aviation use by providing mechanical and electrical protection for the tablet 106 or 306 and the aircraft by being qualified according to RTCA DO-160(x).

The example system 100 can allow uncertified display devices such as PEDs/tablets 106 or 306 to display critical aeronautical information by performing two functions: ICA monitoring and providing crew annunciation of non-nominal ICA status.

ICA monitoring may be accomplished in two layers as follows. The avionics application 108 executing on the server will determine what information/images need to be displayed on the tablet 106 and will encode (e.g., using HTML5) and transmit that information to the avionics display application 110 executing on the tablet 106 or 306. In the first layer, prior to displaying any of this information, the avionics display application 110 will decode the information to be displayed and re-encode it in a dis-similar protocol and "echo back" the information to the server 102, which will compare the echo-back information with the information originally sent. Matching information will result in an "ack" (acknowledgement) from the server to the tablet while a mismatch would generate a "no-ack" and a crew annunciation. This first layer provides for monitoring the ICA to the avionics display application 110 but does not provide for monitoring the link between the avionics display application 110 and the physical display.

In the second layer, the system may monitor the actual information displayed on the screen via the image sensor 322 mounted on the bezel 318. As an example, monitoring may include monitoring all aspects of the display (color and location of every pixel) or using a sampling scheme where the probability of detecting loss of ICA is equivalent or better to the requirements of the Hazard Classification of the application. Thus, the monitoring rigor can be tailored to the criticality of the application. Sampling schemes could be further simplified by using specific patterns like QR codes which are displayed for a few milliseconds (faster than the time it takes for the human eye to perceive) on the display and may be customized for optimal recognizability by the image sensor 322 (e.g., a keystone shape). The codes could be randomly changed in content, location, and timing to add robustness to the sampling scheme. In any case, the optical information imaged by the image sensor 322 is sent back to the server 102 to enable the software application 108 to compare the image detected to what it expected to see based on what it sent to the PED 106 or 306 for display. If a loss of ICA is detected, the server 102/application 108 would activate the appropriate annunciation.

If the server 102/application 108 determines that there has been a loss of ICA, it can activate an annunciation by asserting the appropriate electrical signal on the output bus to activate the coating on the cover film 320 of the tablet mounting adapter 104. As an example, the annunciation might simply put a red 'X' 332 over the display if a failure was detected. An 'X' character could be coated onto the cover film 320. Other more sophisticated (but fixed) imagery or text could (also or alternatively) be coated onto the cover film including one or more textual failure messages. In addition, a fail-condition may also result in the sending of display information to an alternate location such as a different tablet.

Annunciation may be accomplished as follows. The film 320 and coating 328 provides the overall system with the ability to annunciate fixed or variable information to the crew as encoded in the coating 328 or other optically reactive elements. Signal inputs from the server 102 may be used to activate the optical coating 328. The activation may be electrical, similar to the way an LCD is activated, by the application of a voltage across the breadth of the coating.

The activation may also be accomplished by illuminating the coating with a selective bandwidth of emitted light. In this example, light emitting elements such as discrete LEDs may be designed into the bezel of the lid and aimed toward the coating on the film. The LEDs would be energized by a signal or signals from the server and would then illuminate the coating in a flood pattern. The coating would be activated by the illumination provided by the LEDs and would change state to be clearly visible to the crew. The spectrum of light required to activate the coating would be selected to use light not typically found on flight decks either from natural or artificial light to avoid un-commanded activation of the coating.

An alternate implementation may use illumination devices such as laser diodes where the laser light is directed to specifically intended locations by means of providing coordinates from the server to a MEMS Scanner which would direct the excitation light to those intended locations on the cover film. This technique may employ a stroke or raster scan pattern which allows characters or images to be displayed on the cover film.

Figure 5:
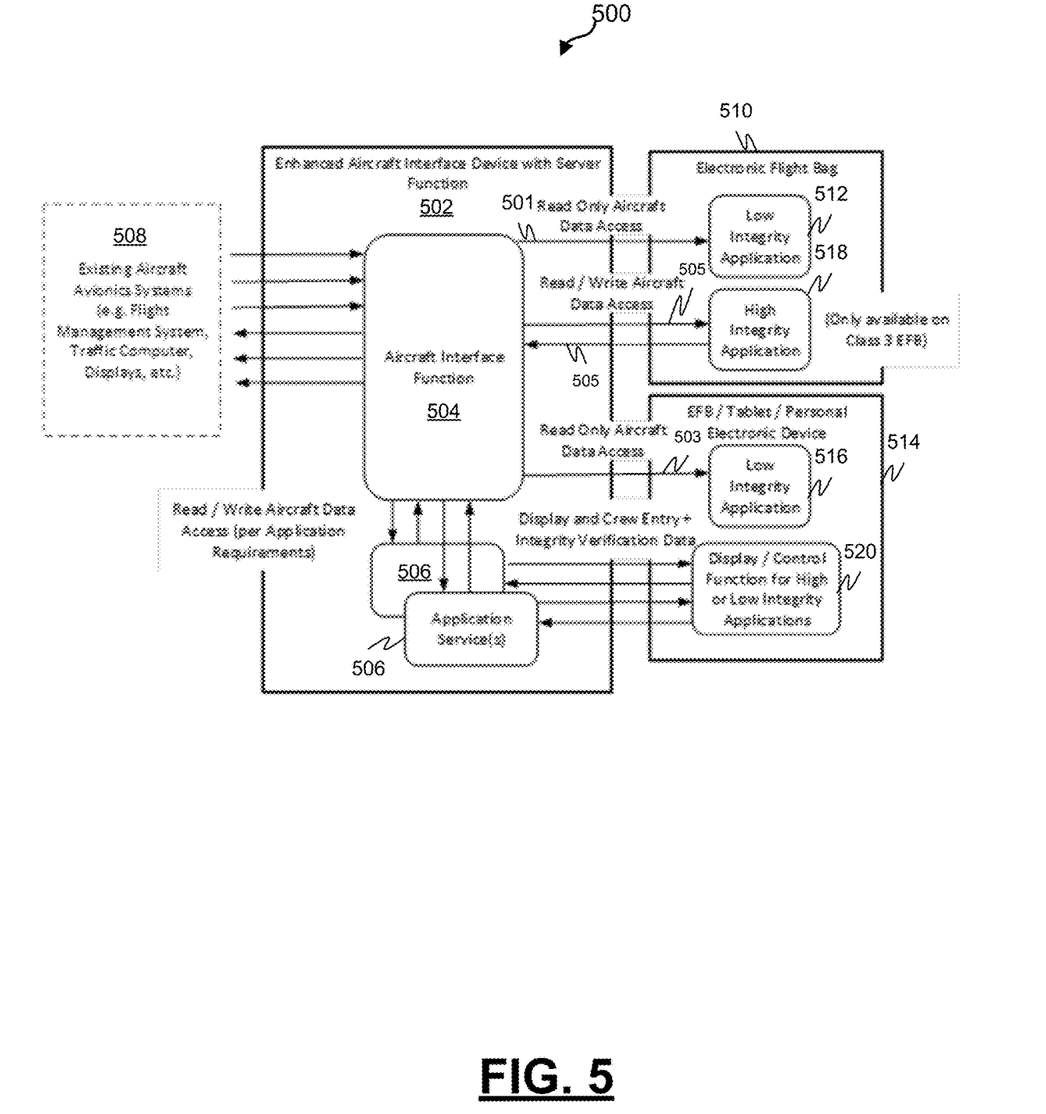
FIG. 5 is a block diagram depicting an example server system in an aircraft that includes an aircraft interface device that has been enhanced with an application server configured to support high integrity applications on lower integrity devices, in accordance with various embodiments.

FIG. 5 is a block diagram depicting an example server system 500 in an aircraft that includes an aircraft interface device (AID) 502 that has been enhanced with an application server configured to support high integrity applications displayed on lower integrity devices. The example AID 502 may support multiple high integrity applications (e.g. airborne situational awareness (AIRB) and various other CNS-ATM applications such as flight deck interval management (FIM) or air traffic control controller/pilot data link communication (CPDLC)). The example AID 502 can also support lower integrity applications such as maps and charts without change to the applications or equipment installation.

The example AID 502 includes at least one processor and a computer-readable storage device or media encoded with programming instructions for configuring the controller. The example AID 502 implements an aircraft interface module 504 and an application server that may include one or more application service modules 506.

The example aircraft interface module 504 is configured to communicate with avionics systems 508 onboard the aircraft, such as a flight management system (FMS), a traffic computer, displays, and others, to transfer data, including mission critical information, between the avionics systems 508 and flight deck display devices. The example aircraft interface module 504 is configured to transfer non-critical information 501, 503 to a flight deck display device, such as low-integrity display device in an electronic flight bag 510, and a PED 514, on a read-only basis, wherein the low-integrity display device and the PED 514 are each configured to execute a low integrity application 512, 516 to display the non-critical information 501, 503. The example aircraft interface module 504 is also configured to exchange mission critical information 505 with a high-integrity display device in an electronic flight bag 510, on a read/write basis, wherein the high-integrity display device executes a high integrity application 518 to display and/or transfer the mission critical information 505. The example aircraft interface module 504, however, is not configured to transfer mission critical information to a low-integrity display device because high integrity applications (e.g., Type C per FAA AC 120-76C) should be supported on installed certified avionics, either "standard" avionics or Class 3 EFBs.

The example application service modules 506 are configured to communicate with the AID 504 and specialized applications 520 executing on specialized display assemblies (e.g., the combination of mounting adapter 104 and PED 106) to exchange mission critical information. The example application service modules 506 are configured to provide a way for applications (not shown) to access mission critical information from avionics systems 508 and to display that information on uncertified display devices such as a PED 514.

The example application service modules 506 may include an interface module configured to transmit application data to a cockpit display assembly for display. The example application service modules 506 may also include an integrity checking module (e.g., data integrity module 202) configured to retrieve image data from an image sensor trained on a display in the display assembly and configured to perform an integrity check on the image data from the image sensor.

The example integrity checking module may be configured to perform an integrity check on the image data from the image sensor by comparing the application data sent to the display assembly with the image data received from the display assembly. The integrity checking module may be configured to analyze the image data to assess the integrity, continuity, and availability (ICA) of the critical aeronautical information displayed on the display device. The integrity checking module may be further configured to transmit an annunciation message, when an integrity check failure occurs (e.g., a problem exists with the image or a loss of ICA of the critical aeronautical information has been detected), to enable the annunciation of the integrity check failure on the display assembly.

In one example implementation, the interface module may be configured to transmit the application data to the PED for display and configured to retrieve image data from the mounting adapter. The integrity checking module may be configured to perform an integrity check on the image data from the image sensor by comparing the application data sent to the display assembly with the image data received from the display assembly and to transmit an annunciation message to the mounting adapter, when an integrity check failure occurs, to enable the annunciation of the integrity check failure on the cockpit display.

Figure 6:
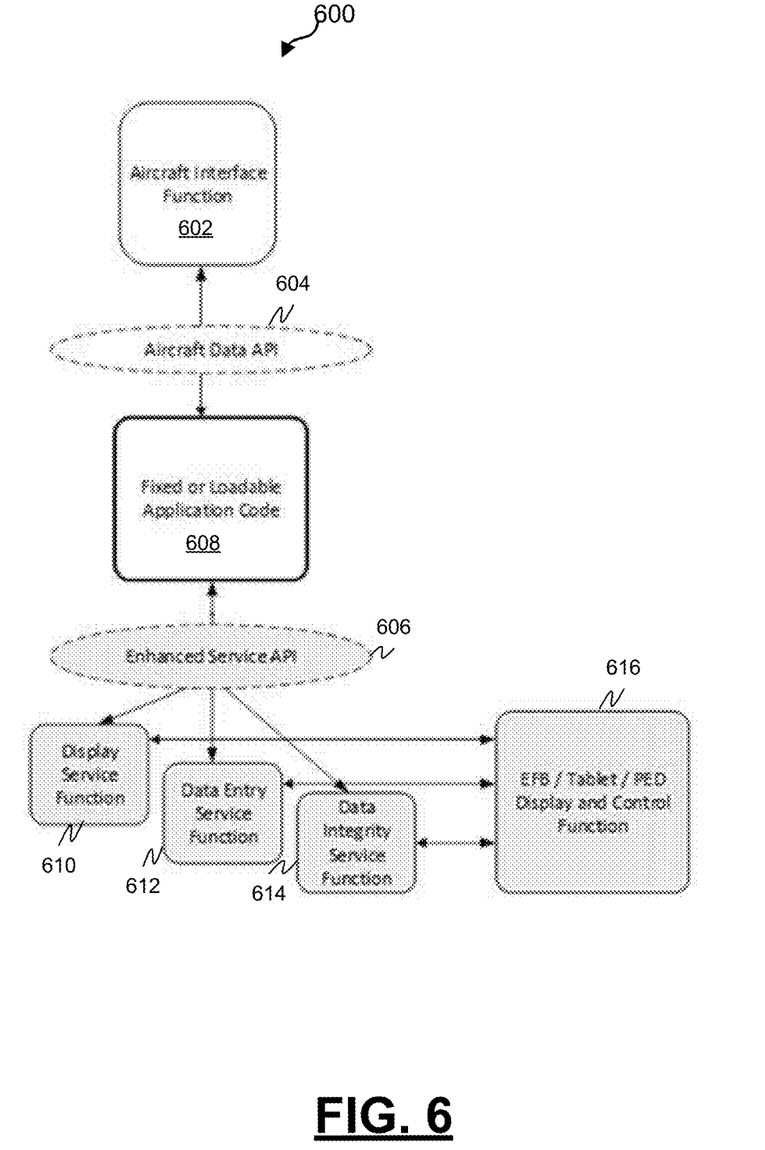
FIG. 6 is a block diagram depicting an example server system wherein an example aircraft interface device is deployed to provide high integrity avionics applications with the ability to display mission critical data on uncertified display devices, in accordance with various embodiments.

FIG. 6 is a block diagram depicting an example server system 600 wherein an example AID is deployed to provide high integrity avionics applications with the ability to display mission critical data on uncertified display devices. The example AID in the example server system 600 provides an aircraft interface module 602, an aircraft data API (application programming interface) 604, and an enhanced service API 606.

The example aircraft interface module 602 is configured to communicate with avionics systems onboard the aircraft, such as a flight management system (FMS), a traffic computer, displays, and others, to exchange data, including mission critical information, between the avionics systems and application modules 608.

The example aircraft data API 604 provides a standard way for an application module 608 to request data from an avionics system and to write data to an avionics system. The example aircraft data API 604 may also provide a standard way for an application module 608 to write non-mission critical information to an uncertified display device and to read and write critical information to a certified display device.

The example enhanced service API 606 is configured to provide display and control functions for the application module 608 to allow the application module 608 to exchange mission critical information with an uncertified display device. The enhanced services API 606 encapsulates via the API a standard way for an application module 608 executing on the server system 600 to access a display service function 610, a data entry service function 612, and a data integrity service function 614. The display service function 610 provides a standard way for the application program 608 to display information on a display assembly (e.g., combination of a mounting device and PED). The data entry service function 612 provides a standard way for the application programs 608 to request data from a display assembly. The data integrity function 614 provides a standard way for the application programs 608 to check on the integrity of the application data displayed on a display assembly.

To display mission critical information on a low integrity device, the application module can be configured to invoke the display service function 610 to transmit the application data to the cockpit display for display and invoke the data integrity function 614 to implement integrity checking on image data from an image sensor (which takes an image of the display on the cockpit display) by comparing the application data with the image data.

An application module 608 may be configured to invoke the display service function 610, data entry service function 612, and data integrity service function to display mission critical information (e.g., critical aeronautical information) on an uncertified display is a specially adapted display assembly. The application module 608 may be configured to invoke the display service function 610 to display mission critical information on a display in the display assembly via an application 616 executing on the display assembly that allows the display and control functions for the application module 608. The application module 608 may be configured to invoke the data entry service function 612 to retrieve mission critical information from the display assembly via the application 616. The application module 608 may be configured to invoke the data integrity service function 614 to perform an integrity check, such as an ICA check, on the display assembly.

In one example implementation, the application module 608 may be configured to invoke the data integrity service function 614 to retrieve image data captured by an image sensor trained on a display in the low integrity device (e.g., PED) of the display assembly. The application module 608 may be configured to invoke the data integrity service function 614 to analyze the image data to determine whether a problem exists with the image displayed on the display. The application module 608 may be configured to invoke the data integrity service function 614 to analyze the image data to assess the integrity, continuity, and availability (ICA) of the critical aeronautical information displayed on the cockpit display. The application module 608 may be configured to invoke the data integrity service function 614 to transmit an annunciation message, when an integrity check failure occurs (e.g., loss of ICA of the critical aeronautical information displayed on the display), to enable the annunciation of the integrity check failure on the display.

The application module 608 may be configured to invoke the display service function to transmit the application data to the PED for display and invoke the data integrity service function 614 to retrieve the image data from the mounting adapter. The application module 608 may be configured to invoke the data integrity function to transmit an annunciation message to the mounting adapter, when an integrity check failure occurs, to enable the annunciation of the integrity check failure on the cockpit display.

Figure 7:
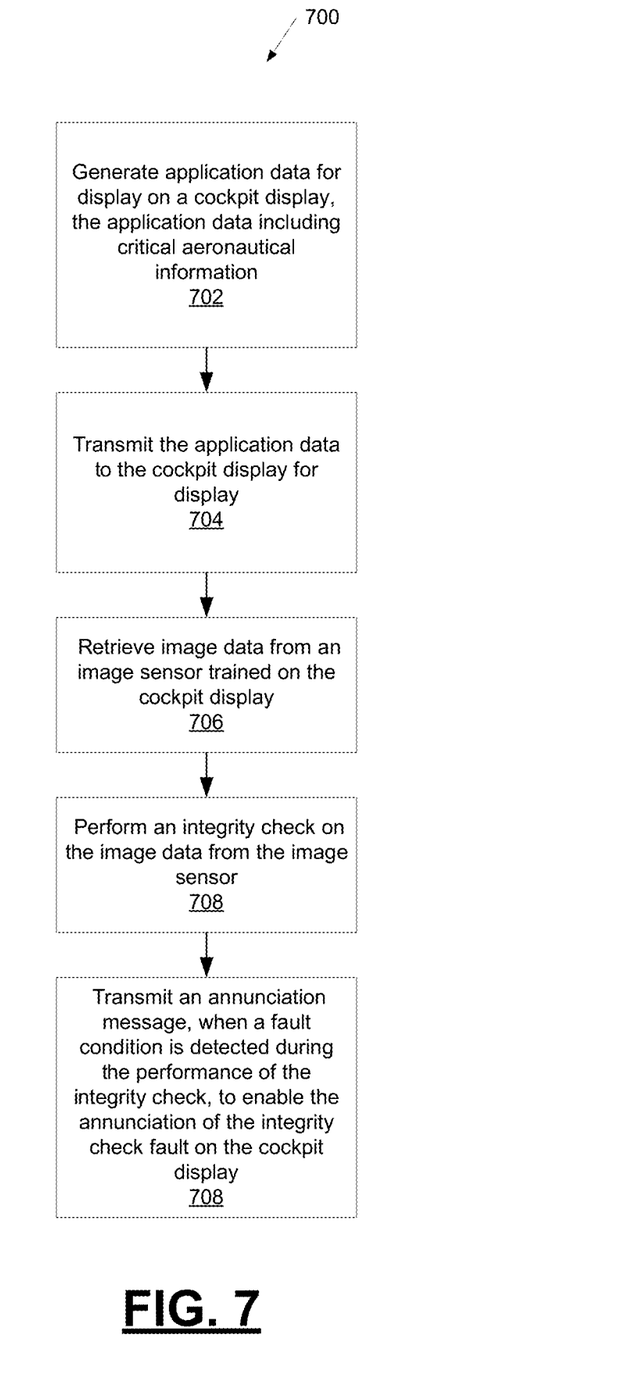
FIG. 7 is a process flow chart depicting an example process in an aircraft computing device for displaying critical aeronautical information on an aircraft display that is not certified for displaying critical aeronautical information, in accordance with various embodiments.

FIG. 7 is a process flow chart depicting an example process 700 in an aircraft computing device for displaying critical aeronautical information on an aircraft display that is not certified for displaying critical aeronautical information. In various embodiments, the process can be scheduled to run based on one or more predetermined events, and/or can run continuously during operation of the aircraft.

The example process 700 includes generating, by the computing device, application data for display on a cockpit display, the application data including critical aeronautical information (operation 702).

The example process 700 includes transmitting, by the computing device, the application data to the cockpit display for display (operation 704). The application data may be transmitted using any of the techniques described earlier such as those described with respect to FIGS. 5 and/or 6.

The example process 700 also includes retrieving, by the computing device, image data from an image sensor trained on the cockpit display (operation 706). The image data may be retrieved using any of the techniques described earlier such as those described with respect to FIGS. 5 and/or 6.

The example process 700 also includes performing, by the computing device, an integrity check on the image data from the image sensor (operation 708). The integrity check may include comparing the image data to the application data and may include assessing the integrity, continuity, and availability (ICA) of the critical aeronautical information displayed in the image data.

The example process 700 also includes transmitting, by the computing device, an annunciation message, when a fault condition is detected during the performance of the integrity check, to enable the annunciation of the integrity check fault on the cockpit display (operation 710). The annunciation message may be transmitted in accordance with any of the techniques described earlier such as those described with respect to FIGS. 5 and/or 6.

Apparatus, systems, methods, techniques and articles are described for enabling a new form of "plug-and-play" for high integrity applications in an environment that may include low integrity hardware and software. Apparatus, systems, methods, techniques and articles are described for separating the application code requiring high integrity (e.g., aircraft spacing algorithms) from standard services such as display and control and allowing those standard functions to be hosted on a low integrity platform such as a class 1 or 2 EFB or tablet computer. Further, apparatus, systems, methods, techniques and articles are described that may provide a standardized application programming interface application programs may use to display and control low integrity platform so that application programs can be developed and deployed independently. Additionally, apparatus, systems, methods, techniques and articles are described that provide for the separation of the application logic from the display and data entry logic and provide for high integrity verification of the display on a low integrity platform.

In one embodiment, a server system on an aircraft comprising one or more processors configured by programming instructions encoded on non-transient computer readable media is provided. The server system is configured to allow critical aeronautical information to be displayed on a cockpit display that is not certified for displaying critical aeronautical information. The server system comprises an aircraft interface device configured to interface with one or more aeronautical systems on the aircraft to retrieve or transmit critical aeronautical information; an application module configured to generate application data for display on the cockpit display wherein the application data includes at least some of the critical aeronautical information; an interface module configured to transmit the application data to the cockpit display for display; and an integrity checking module configured to retrieve image data from an image sensor trained on a display device in the cockpit display and configured to perform an integrity check on the image data from the image sensor.

These aspects and other embodiments may include one or more of the following features. The image data may comprise image data from an optical sensor or a camera. The integrity checking module may be configured to perform an integrity check on the image data from the image sensor by comparing the application data sent to the cockpit display with the image data received from the cockpit display. The integrity checking module may be configured to analyze the image data to assess the integrity, continuity, and availability (ICA) of the displayed critical aeronautical information. The integrity checking module may be further configured to transmit an annunciation message, when an integrity check failure occurs, to enable the annunciation of the integrity check failure on the cockpit display. The integrity checking module may be configured to transmit the annunciation message upon detection of a loss of ICA of the displayed critical aeronautical information. The cockpit display may comprise a mounting adapter and a personal electronic display (PED); the interface module may be configured to transmit the application data to the PED for display; and the integrity checking module may be configured to retrieve image data from the mounting adapter. The integrity checking module may be further configured to transmit an annunciation message to the mounting adapter, when an integrity check failure occurs, to enable the annunciation of the integrity check failure on the cockpit display.

In another embodiment, a server system on an aircraft comprising one or more processors configured by programming instructions encoded on non-transient computer readable media is provided. The server system is configured to allow critical aeronautical information to be displayed on a cockpit display that is not certified for displaying critical aeronautical information. The server system comprises an aircraft interface device configured to interface with one or more aeronautical systems on the aircraft to retrieve or transmit critical aeronautical information; an application module configured to generate application data for display on the cockpit display wherein the application data includes at least some of the critical aeronautical information; and an application programming interface configured to provide a display service function, a data entry service function, and a data integrity function for use by the application module. The display service function is configured to provide a standard way for the application module to display information on the cockpit display. The data entry service function is configured to provide a standard way for the application module to request data from the cockpit display. The data integrity function is configured to provide a standard way for the application module to check on the integrity of the application data displayed on the cockpit display.

These aspects and other embodiments may include one or more of the following features. The application module may be configured to invoke the data integrity function to retrieve image data captured by an image sensor trained on a display device in the cockpit display and analyze the image data to determine whether a problem exists with the image. The application module may be configured to invoke the display service function to transmit the application data to the cockpit display for display and invoke the data integrity function to implement integrity checking on the image data from the image sensor by comparing the application data with the image data. The application module may be configured to invoke the data integrity function to analyze the image data to assess the integrity, continuity, and availability (ICA) of the displayed critical aeronautical information. The application module may be configured to invoke the data integrity function to transmit an annunciation message, when an integrity check failure occurs, to enable the annunciation of the integrity check failure on the cockpit display. The application module may be configured to invoke the data integrity function to transmit the annunciation message upon detection of a loss of ICA of the displayed critical aeronautical information. The cockpit display may comprise a mounting adapter and a personal electronic device (PED) and the application module may be configured to invoke the display service function to transmit the application data to the PED for display and configured to invoke the data integrity function to retrieve the image data from the mounting adapter. The application module may be configured to invoke the data integrity function to transmit an annunciation message to the mounting adapter, when an integrity check failure occurs, to enable the annunciation of the integrity check failure on the cockpit display.

In another embodiment, a computer-implemented method in an aircraft computing device for displaying critical aeronautical information on an aircraft display that is not certified for displaying critical aeronautical information is provided. The method comprises generating, by the computing device, application data for display on a cockpit display wherein the application data includes critical aeronautical information; transmitting, by the computing device, the application data to the cockpit display for display; retrieving, by the computing device, image data from an image sensor trained on a display device in the cockpit display; and performing, by the computing device, an integrity check on the image data from the image sensor.

These aspects and other embodiments may include one or more of the following features. Performing an integrity check on the image data may comprise assessing the integrity, continuity, and availability (ICA) of the critical aeronautical information displayed in the image data. Performing an integrity check may comprise comparing the image data to the application data. The method may further comprise transmitting, by the computing device, an annunciation message, when a fault condition is detected during the performance of the integrity check, to enable the annunciation of the integrity check fault on the cockpit display.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in an exemplary embodiment without departing from the scope of the invention as set forth in the appended claims.

What is claimed is:

1. A server system on an aircraft comprising one or more processors configured by programming instructions encoded on non-transient computer readable media, the server system configured to allow critical aeronautical information to be displayed on a cockpit display that is not certified for displaying critical aeronautical information, the server system comprising:

an aircraft interface device configured to interface with one or more aeronautical systems on the aircraft to retrieve or transmit critical aeronautical information;

an application module configured to generate application data for display on the cockpit display, the application data including at least some of the critical aeronautical information;

an interface module configured to transmit the application data to the cockpit display for display; and an integrity checking module configured to retrieve image data from an image sensor trained on a display device in the cockpit display, perform an integrity check on the image data from the image sensor to determine whether a problem exists with an image displayed on the display device, and enable an actuation source associated with the display device to cause a covering over the display device to annunciate a message indicating that a problem exists with the image displayed on the display device.

2. The system of claim 1, wherein the image data comprises image data from an optical sensor or a camera.

3. The system of claim 1, wherein the integrity checking module is configured to perform an integrity check on the image data from the image sensor by comparing the application data sent to the cockpit display with the image data received from the cockpit display.

4. The system of claim 1, wherein the integrity checking module is configured to analyze the image data to assess the integrity, continuity, and availability (ICA) of the displayed critical aeronautical information.

5. The system of claim 1, wherein the integrity checking module is further configured to transmit an annunciation message, when an integrity check failure occurs, to enable the annunciation of the integrity check failure on the cockpit display.

6. The system of claim 5, wherein the integrity checking module is configured to transmit the annunciation message upon detection of a loss of ICA of the displayed critical aeronautical information.

7. The system of claim 1, wherein:
the cockpit display comprises a mounting adapter and a personal electronic display (PED);
the interface module is configured to transmit the application data to the PED for display;
the image sensor is affixed to the mounting adapter; and
the integrity checking module is configured to retrieve the image data from the mounting adapter, which retrieves the image data from the image sensor affixed to mounting adapter.

8. The system of claim 7, wherein the integrity checking module is further configured to transmit an annunciation message to the mounting adapter which includes the actuation source, when an integrity check failure occurs, to enable the actuation source included with the mounting adapter to cause the covering over the display device to annunciate the integrity check failure on the cockpit display.

9. A server system on an aircraft comprising one or more processors configured by programming instructions encoded on non-transient computer readable media, the server system configured to allow critical aeronautical information to be displayed on a cockpit display that is not certified for displaying critical aeronautical information, the server system comprising:
an aircraft interface device configured to interface with one or more aeronautical systems on the aircraft to retrieve or transmit critical aeronautical information;
an application module configured to generate application data for display on the cockpit display, the application data including at least some of the critical aeronautical information; and
an application programming interface configured to provide a display service function, a data entry service function, and a data integrity function for use by the application module, the display service function configured to provide a standard way for the application module to display information on the cockpit display, the data entry service function configured to provide a standard way for the application module to request data from the cockpit display, and the data integrity function configured to provide a standard way for the application module to check on the integrity of the application data displayed on the cockpit display to determine whether a problem exists with an image displayed on a display device in the cockpit display and enable an actuation source associated with the display device to cause a covering over the display device to annunciate a message indicating that a problem exists with the image displayed on the display device.

10. The server system of claim 9 wherein the application module is configured to invoke the data integrity function to:
retrieve image data captured by an image sensor trained on the display device in the cockpit display; and
analyze the image data to determine whether a problem exists with the image.

11. The server system of claim 10 wherein the application module is configured to:
invoke the display service function to transmit the application data to the cockpit display for display; and
invoke the data integrity function to implement integrity checking on the image data from the image sensor by comparing the application data with the image data.

12. The server system of claim 10 wherein the application module is configured to invoke the data integrity function to analyze the image data to assess the integrity, continuity, and availability (ICA) of the displayed critical aeronautical information.

13. The server system of claim 10 wherein the application module is configured to invoke the data integrity function to transmit an annunciation message, when an integrity check failure occurs, to enable the actuation source to cause the covering over the display device to annunciate the integrity check failure on the cockpit display.

14. The server system of claim 13, wherein the application module is configured to invoke the data integrity function to transmit the annunciation message upon detection of a loss of ICA of the displayed critical aeronautical information.

15. The server system of claim 10, wherein:
the cockpit display comprises a mounting adapter and a personal electronic device (PED);
the image sensor is affixed to the mounting adapter; and
the application module is configured to invoke the display service function to transmit the application data to the PED for display and configured to invoke the data integrity function to retrieve the image data from the mounting adapter, which retrieves the image data from the image sensor affixed to mounting adapter.

16. The server system of claim 15, wherein the application module is configured to invoke the data integrity function to transmit an annunciation message to the mounting adapter, when an integrity check failure occurs, to enable the actuation source to cause the covering over the display device to annunciate the integrity check failure on the cockpit display.

17. A computer-implemented method in an aircraft computing device for displaying critical aeronautical information on an aircraft display that is not certified for displaying critical aeronautical information, the method comprising:
generating, by the computing device, application data for display on a cockpit display, the application data including critical aeronautical information;
transmitting, by the computing device, the application data to the cockpit display for display;

retrieving, by the computing device, image data from an image sensor trained on a display device in the cockpit display; and performing, by the computing device, an integrity check on the image data from the image sensor to determine whether a problem exists with an image displayed on the display device; and enabling an actuation source associated with the display device to cause a covering over the display device to annunciate a message indicating that a problem exists with the image displayed on the display device.

18. The method of claim 17, wherein performing an integrity check on the image data comprises assessing the integrity, continuity, and availability (ICA) of the critical aeronautical information displayed in the image data.

19. The method of claim 17, wherein performing an integrity check comprises comparing the image data to the application data.

20. The method of claim 17, further comprising transmitting, by the computing device, an annunciation message, when a fault condition is detected during the performance of the integrity check, to enable the actuation source to cause the covering over the display device to annunciate of the integrity check fault on the cockpit display.

* * * * *